Jan. 3, 1967  V. E. HAMILTON  3,295,968
LIGHT TRAPPING FILTER AND METHOD OF MAKING
Filed June 11, 1962
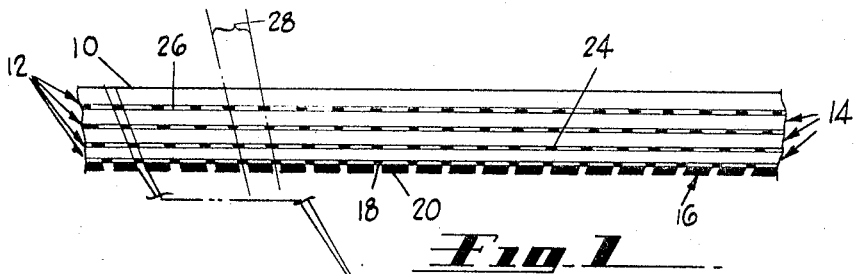
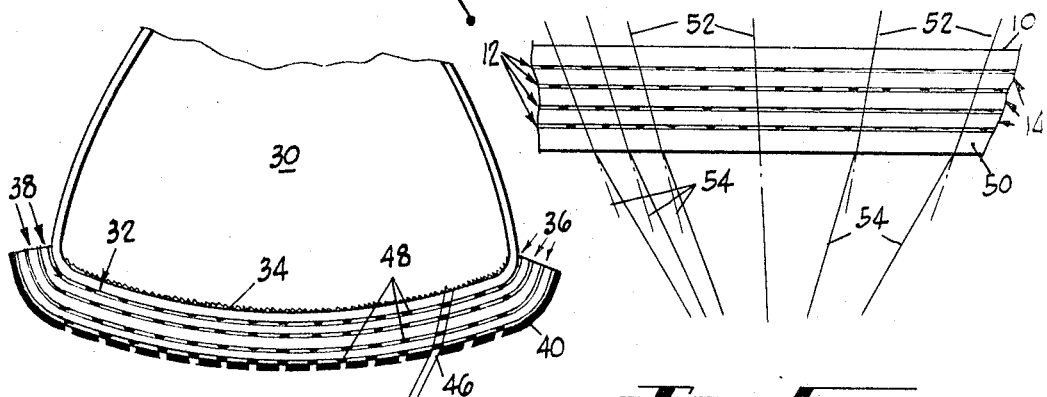
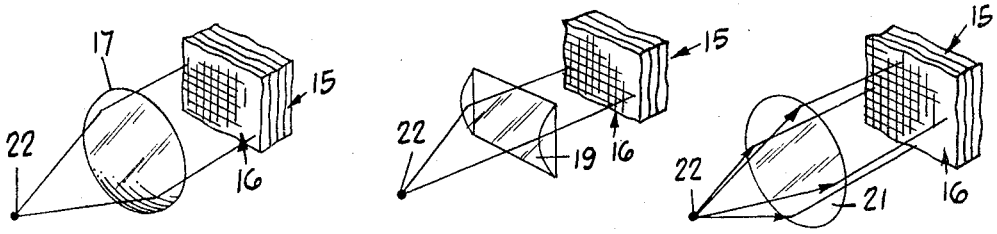
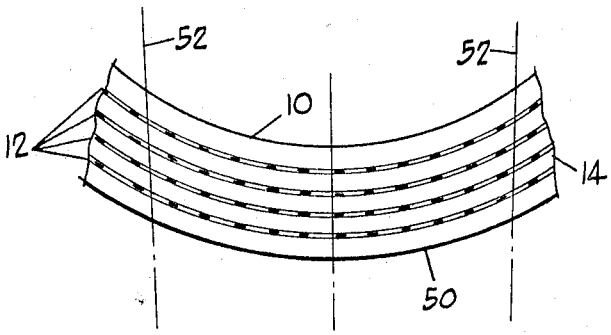
INVENTOR.
VERN E. HAMILTON
BY Edwin Coates
ATTORNEY.

United States Patent Office 3,295,968
Patented Jan. 3, 1967

3,295,968
LIGHT TRAPPING FILTER AND METHOD OF MAKING
Vern E. Hamilton, Palos Verdes Estates, Calif., assignor to Douglas Aircraft Company, Inc., Santa Monica, Calif.
Filed June 11, 1962, Ser. No. 201,693
13 Claims. (Cl. 96—27)

This invention relates to a light ray filter for use primarily with a diffuse radiant screen presenting reproduced images, and is directed particularly to such filter which will trap ambient light rays angularly directed toward such screen. The filter traps both diffuse and concentrated light, thus preventing all off-axis light from striking the screen and degrading the image contrast, and consequently improving the quality of the image which is viewed.

Cathode ray tubes are typical examples of diffuse radiant screens and are particularly susceptible to the effects of being struck by ambient light rays. As is generally known, a cathode ray tube has a glass front wall, the inner surface of which is coated with phosphors which are caused to glow momentarily when struck from the rear by electrons from one or more electron guns in a selective manner to produce an image of some sort. When ambient light rays strike the front surface of the glass they are refracted inwardly and strike a multiplicity of phosphors. The light energy is reflected diffusely from these phosphors whether or not they are being activated by the electron gun. The result is that many of the shadow areas or low lights are illuminated and approach the brightness of the high-lights, thus degrading the contrast. The low lights may be made as bright as the highlights in some cases and the picture may be completely lost.

Various schemes have been devised to prevent ambient light rays from striking the cathode tube glass or phosphors, either of which may be considered as the "screen." Large hoods have been placed around the tubes extending toward the viewers but these are very clumsy. Honey-comb cores have been placed in front of the tube but the honeycomb walls are not perfect absorbers so they reflect the light rays onward to strike the screen anyway. My co-pending application for patent on Ambient Light Filter, Serial No. 138,855, filed September 18, 1961, discloses a novel construction which solves the problem.

Briefly, that novel construction comprises a filter body of transparent material in which are embedded a plurality of filter elements having a grid pattern. Each element constitutes a tier of alternating transparent and light absorbing material in closely spaced relation to constitute a multiplicity of light transmitting apertures bordered by light absorbing material. The grid pattern may be formed of generally parallel straight or wavy lines, or lines crossing each other to produce cells of varying shapes including but not limited to squares, rectangles, and diamonds. The tiers are in generally parallel relation to each other and are spaced depthwise of the filter body with the light transmitting apertures in registry to constitute depthwise directed viewing cells. The axes of the cells may be normal to the plane of the filter body or at some other preselected angle, and may be parallel or divergent within limits.

Ambient light rays striking the surface of the filter body at acute angles other than normal are refracted into the cells at an angle, striking one or another of the depthwise spaced lines of opaque or light absorbing material and are absorbed thereby. The success of such filter results from the fact that the cells are very small in at least one lateral dimension and the lines forming the cell boundaries are extremely thin in the depthwise direction so that their edges present no appreciable grazing surface to reflect light rays onwardly. In fact, in a typical example the width of the apertures may be from .015 to .020 inch and the line width from .002 to .004 inch. The line thickness may vary from .0001 to .001 inch and the depthwise spacing between lines may be of the order of .010 inch. Such a filter with six filter elements is only one sixteenth inch thick.

It will be readily appreciated that the manufacture of a filter of this type presents a very difficult problem, particularly with respect to the registry of the apertures in the several tiers. The layers bearing the filter elements must be very finely adjusted and then held in adjusted position until they are firmly cemented. This involves, among other things, precise apparatus for checking the registry. The problem becomes even more difficult when the axes of the viewing cells in the finished filter are to converge at or near the view point, as in a cathode ray tube for use in an airplane, intended to be viewed primarily by one person. The dimensional variations from one filter element to the next in order to achieve this convergence are extremely small and require much painstaking work.

These problems are greatly simplified and in fact practically eliminated by the use of the present invention. In my copending application the filter is disclosed as being made up of a suitable number of layers, such as six for example, of a relatively stiff transparent plastic material such as cellulose acetate or ethyl cellulose, each layer bearing on one face a filter element of grid form as previously described, produced by printing with printers ink or by photographic means. It was thus necessary to align six separate printed layers until the grids were in registry and to keep them in registry while they were being cemented or otherwise secured together.

In the present invention a laminate of transparent material is applied to a base layer which in one form is a transparent plastic sheet such as described above. It may be either flat or curved. The laminate consists of alternating layers of photo-sensitive and non-photo-sensitive material. The photo-sensitive layers are extremely thin, preferably of the order of two microns. The thickness of the non-photo-sensitive layers is of the order of ten microns or more. This results in a total thickness thin enough to permit penetration of the subsequently described developing chemicals. Any suitable material may be used for this purpose and the laminate may be made up prior to applying it to the base layer. However it is presently preferred to form the laminate in place by applying a first coating of sensitized gelatin emulsion to the base layer in the usual manner, such as by the use of a roller or squeegee. A second layer of unsensitized gelatin emulsion is then applied in the same way and the process is repeated until the desired number of sensitized layers have been formed, the outermost layer usually being a sensitized one.

A mask is now placed over the outermost surface and temporarily secured in place, as by vacuum clamping means. The mask may be made of photographic film or the like and is divided into alternating transparent and opaque areas in a positive or negative pattern of the desired grid form, whichever is most suited to the subsequent development method. The assembly is now exposed to a point light source at approximately the same position in relation to the assembly as the eye point which will subsequently be used to view the device in operation. Thus, if the view point is normally laterally displaced from the normal to the cathode ray tube, the light source will be correspondingly displaced.

The light from the point source will be refracted through the transparent areas of the mask to produce corresponding latent images as it passes through each of the sensitized layers. The mask is then removed and the laminate is developed in conventional fashion to produce permanent filter elements of the desired grid form spaced from each other by the thickness of the unsensitized layers. Development may also include bleaching and re-dyeing the image to achieve sufficient absorption of the ambient light. Since a point light source is used, the axes of the viewing cells produced by the grid patterns will be convergent and in perfect registry, and with refraction errors automatically corrected.

The same technique can be used to form a filter in situ directly on the face of a cathode ray tube, using the glass front wall of the tube as the base layer. The same convergence of viewing cells can be obtained and the problem of curving a filter to fit the face of the tube is eliminated.

In either case mentioned above the filter is completed by applying a protective layer of transparent material, either plastic or glass, to the outermost surface of the filter to prevent scratching or other damage to the filter elements.

In one variation of the invention a complete filter can be made up in flat form, using plastic base layer and protective layer, with the axes of the viewing cells convergent. The filter can now be stretch formed to any desired degree of curvature with a corresponding decrease in convergence. The process may be carried to the point where the axes are substantially collimated.

Various other advantages and features of novelty will be pointed out or become apparent in the course of the detailed description of the invention in conjunction with the attached drawing in which:

FIGURE 1 is a schematic view in cross section of a filter body with a mask in place and a source of light to produce latent images;

FIGURE 2 is a similar view showing the filter being formed on the face of a cathode ray tube;

FIGURE 3 is a schematic perspective view showing a collimating lens interposed between the light source and the mask-filter assembly;

FIGURE 4 is a similar view incorporating a cylindric lens;

FIGURE 5 is a similar view incorporating an ellipsoidal lens;

FIGURE 6 is a schematic cross sectional view of the filter of FIGURE 1 with the protective layer in place; and FIGURE 7 is a schematic cross sectional view of the filter of FIGURE 3, stretch formed to vary the convergence of the viewing cells.

Referring now to the drawing in detail, FIGURE 1 illustrates an assembly consisting of a base layer 10 of transparent material, preferably a plastic such as cellulose acetate or ethyl cellulose, and a series of alternating layers 12, 14 of transparent material. Layers 12 are photosensitive and layers 14 are non-photo-sensitive. While any suitable material may be used it is presently preferred to use a high quality gelatin emulsion.

Thesse layers may be first made up into a laminate and then applied to the base layer 10 but it is more desirable to form the laminate in place by coating a first layer 12 directly on base layer 10, applying it in liquid form with a roller, squeegee, or the like, hardening it in place, applying thereover a first layer 14 and hardening in place in the same way, and repeating the process until the laminate is built up to the desired number of layers. Preferably, though not necessarily, a photo-sensitive, or sensitized, layer 12 is outermost.

The article of manufacture described above may now be processed to produce a transparent body bearing, in spaced planes therein, a plurality of opaque patterns of predetermined form. In the present case the predetermined form is a grid adapted to the immediate purpose. The grid may be a plurality of generally parallel lines which may be straight or wavy. The first set of lines may be crossed by other lines to produce enclosed transparent areas completely surrounded by opaque areas in any desired form. The most common figures are squares, rectangles, and diamonds.

To accomplish this processing a mask 16 is laid on the outermost face 12 of the assembly and temporarily secured thereto. This can be done readily on a conventional vacuum clamping table. The mask is preferably a layer or sheet of photographic film which has been developed to produce the desired grid pattern in the form of alternating transparent areas 18 and opaque areas 20. The masked article is now exposed to a point light source 22, the rays 23 of which are refracted through the transparent areas of mask 16 and pass through all of the subadjacent layers. Wherever a ray strikes any portion of a layer 12 it produces a latent image, here shown as opaque areas 24. At this time, of course, there is no visible image.

After the exposure, the mask is removed and the assembly is subjected to the usual developing procedure in the course of which areas 24 are developed to visible form and fixed for permanence. Those areas 26 of layers 12 which were not light struck did not contain any latent images and hence remain transparent after the developing process. Since the layers 14 were not photo-sensitive, the light coming through the mask had no effect on them and they remain transparent throughout. It will be understood that the invention can be practiced equally well with photographic material of the positive to positive type, using appropriate development techniques. The opaque and transparent portions of the grid pattern on the mask would, of course, be reversed to produce the desired end result.

The filter produced as above described is now a very thin, substantially planar filter body of completely transparent material bearing a plurality of filter elements in grid form, the elements being substantially planar and parallel and suspended in depthwise spaced relation in the filter body. The transparent areas of the filter elements, having been produced simultaneously in a unitary body, are in perfect predetermined registry and it will be seen that they form depthwise directed viewing cells 28, the axes of which converge toward a point on the viewer's side of the filter.

While the various figures of the drawing show lines indicating the individual layers, it will be appreciated that this has been done only to clarify the explanation. In fact all of the layers blend into unity and internal reflections are eliminated. Also the sizes of the elements and of the opaque grid lines have been greatly exaggerated for clarity. Layers 12 and the grid lines 24 are only two microns thick, and layers 14 may be of the order of ten microns thick. The pitch of the grid lines may be as much as 1000 per inch.

FIGURE 2 illustrates how substantially the same technique can be used to form a filter in situ directly on a diffuse radiant screen such as a cathode ray tube. In this figure a forward portion of a conventional cathode ray tube 30 is shown. The tube includes the usual glass front wall 32 having a double curvature. On the inside surface of wall 32 are deposited the usual phosphors 34 which glow momentarily when struck by electrons from the electron gun, not shown, located at the rear of the tube. In the known manner they produce a diffuse radiant picture which varies with the signal sequence from the electron gun.

In this modification wall 32 serves the purpose of the base layer 10 of FIGURE 1. Alternating layers 36, 38 of photosensitive and non-photo-sensitive material are laminated onto wall 32 until the desired number of layers have been deposited. A mask 40, of the same type as mask 16 but which has been stretch formed to the appropriate shape, is now placed over the assembly and temporarily secured, as by vacuum clamping. Again a point light source 42 is used and its rays 44 pass through the transparent areas 46 in the mask to produce latent images 48 of the grid pattern in the various layers 36. The mask is now removed and the laminate subjected to the usual developing procedure to make the grid patterns visible and permanent. As in the previous case the patterns are perfectly registered and the axes of the resulting viewing cells are convergent.

The same basic technique can be used to produce filters in which the axes of the viewing cells in their original configuration are collimated or converged in only one plane or differentially in two planes by interposing suitable lenses between the point light source and the mask-filter assembly as indicated in FIGURES 3, 4 and 5. In FIGURE 3 the point light source 22 is suitably spaced from the assembled filter body 15 and mask 16, and spheric lens 17 is located as shown to produce parallel lines of light rays entering the mask. The filter thus exposed and developed will have collimated viewing cells. Without the use of such lens or equivalent equipment, it would be necessary to space the light source an unreasonable distance from the mask to produce viewing cell axes which are only slightly convergent. In FIGURE 4 a cylindric lens 19 is substituted to re-direct the rays so that the cells are collimated in the vertical plane. In FIG. 5 an ellipsoidal lens 21 is substituted to differentially re-direct the rays in two planes.

In FIGURE 6 the assembly of FIGURE 1 is shown with the addition of a protective layer 50 of a transparent material, such as plastic or glass. This layer protects the relatively delicate filter elements from damage by scratching or other causes. A similar protective layer curved to shape, is applied to the modification of FIGURE 2 after developing. It will be observed that the axes 52 of the viewing cells converge toward a common point and the axes of the light rays 54 are refracted to converge to a common point closer to the filter.

In the event that it is desired to produce a filter having single or double curvature and with the axes of the viewing cells less convergent than those of FIGURE 6, even parallel, it can be accomplished as indicated in FIGURE 7. Here the filter body of FIGURE 1 has been stretch formed to the curvature shown, with the result that axes 52 of the viewing cells converge at a very far distant point. By controlling the extent of stretch forming the axes can be made more convergent than shown in FIGURE 7 or they can be made substantially parallel. This results from the fact that when a sheet or plate is bent into a curve the inner side of the curve is compressed and the outer side stretched.

Since layers 12 and 14 are much softer and more flowable than layer 10 or layer 50 it is preferable to do the forming before the protective layer is attached. In such case there is practically no compression of layer 10 but layers 12 and 14 can be stretched very readily to the extent desired. After this is accomplished the correspondingly formed layer 50 is then permanently secured in place.

Consideration of the above description reveals that the invention eliminates the difficulty and expense previously involved in manufacture of a filter of the present type including the problems of registry and cementing, and produces a filter having the desired grid patterns suspended in a transparent matrix. Moreover, correction for refraction is achieved automatically.

It will be apparent that various changes and modifications may be made in the materials, constructions, and methods herein disclosed without departing from the spirit of the invention and it is intended that all such changes and modifications shall be embraced within the scope of the following claims.

I claim:
1. A method of producing an ambient light trapping filter having a plurality of substantially parallel depthwise spaced filter elements of grid form in predetermined registry, comprising the steps of: applying to a transparent base layer a laminate consisting of a plurality of layers of photo-sensitive material separated by layers of non-photo-sensitive material; all of said layers being bonded together and being permeable in-situ by a photo-developing fluid; placing over and in contact with said laminate a mask having transparent portions corresponding to a predetermined grid pattern with opaque portions therebetween; exposing said laminate to a source of light passing through the transparent portions of said mask to produce latent images of corresponding grid patterns in each of said photo-sensitive layers in predetermined registry with each other; and developing said latent images into permanent visible form, retaining all of the material of said layers in place to produce a final laminate of substantially uniform thickness constituting a transparent panel bearing between its faces a plurality of depthwise spaced patterns of grid markings in precise registry.

2. A method as claimed in claim 1 in which the light is supplied from a point light source to cause the axes of the viewing cells formed by said depthwise spaced filter elements to converge.

3. A method of producing an ambient light trapping filter having a plurality of substantially parallel depthwise spaced filter elements of grid form in predetermined registry, comprising the steps of: applying to a transparent base layer a laminate consisting of a plurality of layers of photo-sensitive material separated by layers of non-photosensitive material; all of said layers being bonded together and being permeable in-situ by a photo-developing fluid; exposing said laminate to a source of light in the form of a predetermined grid pattern to produce latent images of corresponding grid patterns in each of said photo-sensitive layers in predetermined registry with each other; and developing said latent images into permanent visible form, retaining all of the material of said layers in place to produce a final laminate of substantially uniform thickness constituting a transparent panel bearing between its faces a plurality of depthwise spaced patterns of grid markings in precise registry.

4. A method as claimed in claim 3 and, in addition thereto; the step of stretch forming said laminate into a curved form after exposure to alter the directional relationship of the axes of at least some of the viewing cells formed by said depthwise spaced filter elements.

5. A method as claimed in claim 3 in which the layers of photo-sensitive material are made of the order of two microns thick and the layers of non-photo-sensitive material are made of the order of ten microns thick.

6. A method as claimed in claim 3 in which at least the layers of photo-sensitive material are formed from a gelatin emulsion.

7. A method of producing an ambient light trapping filter having a plurality of substantially parallel depthwise spaced filler elements of grid form in predetermined registry, comprising the steps of: applying to a transparent base layer a layer of photo-sensitive material; applying thereover a layer of non-photo-sensitive material; repeating the applications of sensitive and non-sensitive material until a laminate is formed having the desired number of layers; all of said layers being bonded together and being permeable in-situ by a photo-developing fluid; exposing said laminate to a source of light in the form of a predetermined grid pattern to produce latent images of corresponding grid patterns in each of said photo-sensitive layers in predetermined registry with each other; and developing said latent images into permanent visible form, retaining all of the material of said layers in place to produce a final laminate of substantially uniform thickness constituting a transparent panel bearing between its faces a plurality of depthwise spaced patterns of grid markings in precise registry.

8. A method of producing an ambient light trapping filter in situ on the face of a cathode ray tube, comprising the steps of: applying directly to the exposed double curved glass face of a cathode ray tube a plurality of alternating layers of sensitized and non-sensitized photo-emulsion to form a double curved laminate of the desired number of layers; exposing said laminate to a source of light in the form of a predetermined grid pattern to produce latent images of corresponding grid patterns in each of said sensitized layers in predetermined registry with each other; and developing said latent images into permanent visible form.

9. A method of producing an ambient light trapping filter having a plurality of substantially parallel depthwise spaced filter elements of grid form in predetermined registry, comprising the steps of: forming a filter body of a plurality of thin layers of transparent material, at least some of the layers bearing filter grid patterns in the form of light absorbing areas alternating with transparent light passages; said grid patterns being spaced from each other in a depthwise direction and being in depthwise registry so that said light passages define depthwise directed viewing cells; the axes of said viewing cells converging toward a common point; and re-forming the filter body to bring the axes of said viewing cells to a predetermined degree of parallelism.

10. A method of producing an ambient light trapping filter having a plurality of substantially parallel depthwise spaced filter elements of grid form in predetermined registry, comprising the steps of: preparing a laminate consisting of a plurality of layers of photo-sensitive material separated by layers of non-photo-sensitive material; all of said layers being bonded together and being permeable in-situ by a photo-developing fluid; placing over and in contact with said laminate a mask having transparent portions corresponding to a predetermined grid pattern with opaque portions therebetween; providing a point light source to emit rays passing through the transparent portions of the mask to expose areas of the layers of photo-sensitive material; arranging a lens of predetermined configuration between the light source and the mask to control the directions of the light rays passing through the mask and the consequent registry of the latent images produced in said photo-sensitive layers; and developing said latent images into permanent visible form, retaining all of the material of said layers in place to produce a final laminate of substantially uniform thickness constituting a transparent panel bearing between its faces a plurality of depthwise spaced patterns of good markings in precise registry.

11. A method as claimed in claim 10; said lens being a collimating lens.

12. A method as claimed in claim 10; said lens being a cylindric lens.

13. A method as claimed in claim 10; said lens being an ellipsoidal lens.

References Cited by the Examiner

UNITED STATES PATENTS

| | | | |
|---|---|---|---|
| 2,257,143 | 9/1941 | Wood | 96—67 X |
| 2,448,552 | 9/1948 | Schulze | 96—67 X |
| 2,449,093 | 9/1948 | Weingarten | 96—67 X |
| 2,478,444 | 8/1949 | Yule et al. | 96—116 |
| 2,844,734 | 7/1958 | Hartmann | 96—1 X |
| 2,870,010 | 1/1959 | Sadowsky et al. | 96—27 X |
| 3,037,419 | 6/1962 | Nixon | 88—1 |
| 3,144,333 | 7/1964 | Waldherr | 96—17 |

FOREIGN PATENTS

| | | |
|---|---|---|
| 327,312 | 12/1902 | France. |
| 10,098 | 4/1897 | Great Britain. |

J. TRAVIS BROWN, *Acting Primary Examiner.*

DAVID H. RUBIN, ALVIN E. TANENHOLTZ,
*Examiners.*

J. RAUBITSCHEK, *Assistant Examiner.*